United States Patent
Eddings et al.

(10) Patent No.: US 9,226,321 B1
(45) Date of Patent: Dec. 29, 2015

(54) INITIATING AN EMERGENCY MODE

(71) Applicant: Sprint Communications Company L.P., Overland Park, KS (US)

(72) Inventors: Justin Eddings, Eudora, KS (US); Corinne June Fitch, Shawnee, KS (US); Jeremy Jackson Haney, Olathe, KS (US); Kevin Lee Staples, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 139 days.

(21) Appl. No.: 14/019,109

(22) Filed: Sep. 5, 2013

(51) Int. Cl.
*H04W 4/02* (2009.01)
*H04W 76/00* (2009.01)
*H04W 4/22* (2009.01)
*G08B 25/01* (2006.01)

(52) U.S. Cl.
CPC .............. *H04W 76/007* (2013.01); *H04W 4/22* (2013.01); *G08B 25/016* (2013.01)

(58) Field of Classification Search
USPC .......................... 455/404.1, 404.2; 340/573.1
See application file for complete search history.

(56) References Cited

U.S. PATENT DOCUMENTS

| 5,440,301 A * | 8/1995 | Evans ................... G08B 26/001 340/3.3 |
| 2004/0051641 A1* | 3/2004 | Fordyce et al. ............ 340/573.1 |
| 2004/0113836 A1* | 6/2004 | Rickerson, Jr. .......... 342/357.07 |
| 2010/0124900 A1* | 5/2010 | Lui et al. ........... H04M 1/72541 455/404.2 |
| 2011/0230161 A1* | 9/2011 | Newman .................... 455/404.1 |

FOREIGN PATENT DOCUMENTS

CN          202633088 U  * 12/2012

* cited by examiner

*Primary Examiner* — Daniel Lai

(57) ABSTRACT

Systems, methods, devices, and computer-readable media for initiating an emergency mode are provided. Emergency modes may be initiated from mobile devices in an accessible manner while still avoiding accidental actuation as a common occurrence. Some devices are simplified to the level of only having a single button so it may be quite difficult to dial a number (as there is no dial pad). In particular, it may be quite difficult to dial 9-1-1 in an emergency situation. Further, if only a single action is required in order to initiate an emergency mode on any user device, accidental actuation may become quite common. To combat this, a sequence of actions may be used such that accidental actuation is avoided and emergency modes are still accessible on user devices without dial pad functionality. In particular, a simultaneous push/pull action may initiate an emergency mode.

20 Claims, 4 Drawing Sheets

INITIATING AN EMERGENCY MODE

BRIEF SUMMARY

A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, initiating an emergency mode of a user device. In particular, the present invention is directed to initiating emergency calls from mobile devices. Emergency call functionality is a required feature of all mobile devices. While it is desirable to provide easy access for emergency call functionality, it should not be so accessible that accidental actuation is a common occurrence.

BRIEF DESCRIPTION OF THE DRAWINGS

Illustrative embodiments of the present invention are described in detail below with reference to the attached drawing figures, and wherein.

DETAILED DESCRIPTION

Figure 1:
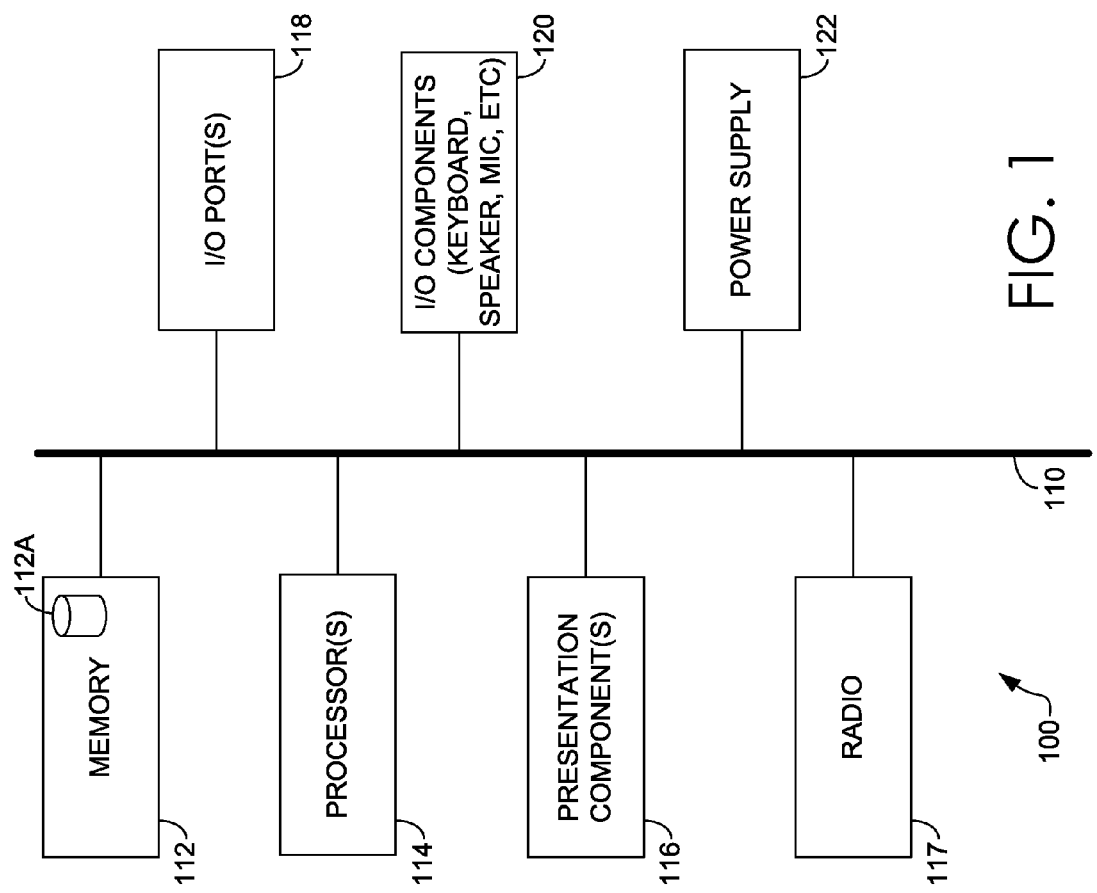
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or set of instructions embodied on one or more computer-readable media. As mentioned, embodiments of the present invention are directed toward initiating an emergency mode of a user device. In particular, the present invention is directed to initiating emergency calls from mobile devices in an accessible manner while still avoiding accidental actuation as a common occurrence. If devices are simplified to the level of only having a single button, it may be quite difficult to dial a number (as there is no dial pad). In particular, it may be quite difficult to dial 9-1-1 in an emergency situation. Further, if only a single action is required in order to initiate an emergency mode on any user device, accidental actuation may become quite common. To combat this, a sequence of actions may be used such that accidental actuation is avoided and emergency modes are still accessible on user devices without dial pad functionality.

Accordingly, in one aspect, the present invention is directed to one or more computer-readable storage media having computer-executable instructions embodied thereon that, when executed, perform a method of initiating an emergency mode. The method includes receiving a first indication indicating selection of a selection key of a user device, receiving a second indication indicating extension of a pull cord of the user device, and in response to receiving the first indication and the second indication, initiating an emergency phone call.

In another aspect, embodiments of the present invention are directed to a method for initiating an emergency mode. The method includes receiving a first indication indicating selection of a selection key of a user device, receiving a second indication indicating extension of a pull cord of the user device while the selection key is simultaneously selected, and automatically initiating an emergency phone call.

In yet another aspect, a user device for initiating an emergency mode is provided. The user device includes a pull cord configured to extend outward from the user device, and a selection key configured such that selection thereof, in combination with extension of the pull cord, automatically results in initiating of an emergency phone call.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
HARQ Hybrid Automatic Repeat Request
HLR Home Location Register
HSDPA High-Speed Downlink Packet Access
LTE Long Term Evolution
PA Power Amplifier
PC Personal Computer
PDA Personal Digital Assistant
RAM Random Access Memory
ROM Read Only Memory
TDMA Time Division Multiple Access
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for initiating an emergency mode of a user device. In particular, the present invention is directed to initiating emergency calls from mobile devices in an accessible manner while still avoiding accidental actuation as a common occurrence. If devices are simplified to the level of only having a single button, it may be quite difficult to dial a number (as there is no dial pad). In particular, it may be quite difficult to dial 9-1-1 in an emergency situation. Further, if only a single action is required in order to initiate an emergency mode, accidental actuation may become quite common. To combat this, a sequence of actions may be used such that accidental actuation is avoided and emergency modes are still accessible on user devices without dial pad functionality.

Figure 2B:
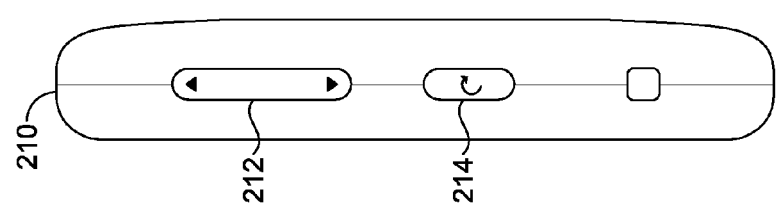
FIG. 2B is a side view of a user device, in accordance with embodiments of the present invention.
Figure 2A:
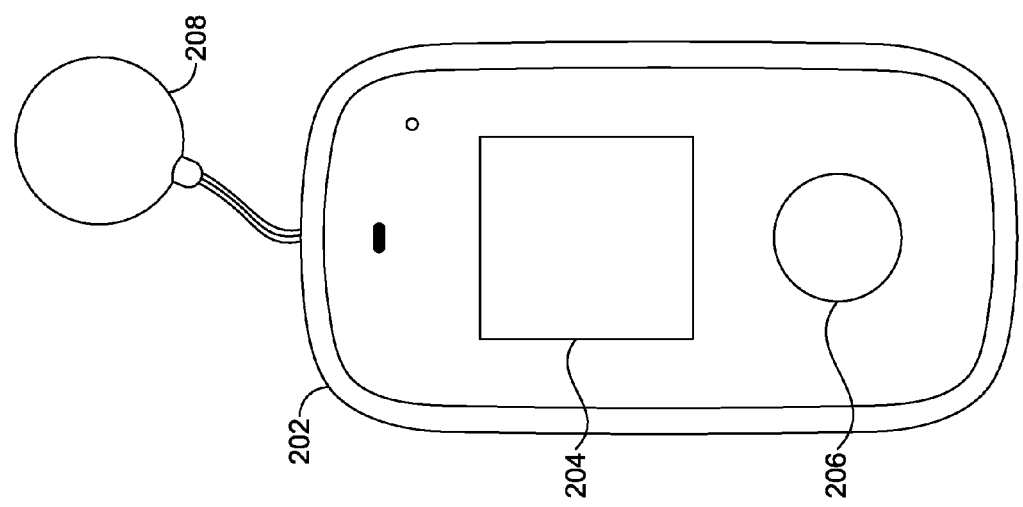
FIG. 2A is a front view of a user device, in accordance with embodiments of the present invention.

Several sequences of actions may be utilized in order to enter an emergency mode. In order to describe the sequences of actions, an exemplary user device may be described for illustrative purposes only. FIG. 2A provides an exemplary user device 202. The user device 202 may be suitable for use in a network environment where one or more user devices 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize a network (not shown) to communicate with other computing devices (e.g., a mobile device(s), a server(s), a personal computer(s), etc.). In embodiments, the network is a telecommunications network (s), or a portion thereof. A telecommunications network might include an array of devices or components, some of which are not shown so as to not obscure more relevant aspects of the invention. Components such as terminals, links, and nodes (as well as other components) can provide connectivity in some embodiments. The network can include multiple networks, as well as being a network of networks, but is shown in more simple form so as to not obscure other aspects of the present invention. The network can be part of a telecommunications network that connects subscribers to their immediate service provider. In embodiments, the network can be associated with a telecommunications provider that provides services to user devices, such as user device 202. For example, the network may provide voice services to user devices or corresponding users that are registered or subscribed to utilize the services provided by a telecommunications provider. The network can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

The user device may include, among other things, a user interface 204, a selection key 206, and a pull cord 208. Additionally, FIG. 2B illustrates additional features of the exemplary user device 210 may be a volume key 212 and a home key 214. Returning to FIG. 2A, the user device 202 has been simplified to provide a single button (i.e., the selection key 206) to control the user device 202. The selection key 206 may be configured for, among other things, entering commands into the user device 202 such as selecting a call recipient from a pre-populated list of approved callees. In an embodiment, the user device 202 is not able to dial numbers into the phone (as it does not have a keypad or a user interface-displayed keypad) but, rather, must select people to call from a pre-populated list of approved call recipients. This may be desired by parents who wish to give their child a phone for emergency purposes and only want them to be able to call a select group of individuals. In an embodiment, the pre-populated list includes three numbers that may be called by the user device 202. Additionally, the user device 202 may also be restricted on the number of incoming calls and may only receive calls from a second pre-populated list of approved callers. In an embodiment, the second pre-populated list includes up to twenty numbers that may dial the user device 202.

The user device 202 may also include a pull cord 208 that may be pulled in order to alert one or more individuals of the existence of an emergency situation. In an embodiment, the pull cord 208 activates an emergency siren when pulled such that the emergency siren sounds and one or more individuals are notified of the emergency situation. The user device 202 may also communicate messages to one or more individuals alerting them that the pull cord 208 has been activated. The messages may be text messages, email messages, phone calls, or the like. In order to deactivate the emergency siren, the user simply reinserts the pull cord 208 into the user device 202.

As is evident, with only a pre-populated list of approved call recipients, there is no way to dial 9-1-1 in an emergency situation. Additionally, the pull cord 208 provides a means for audibly alerting one or more individuals of an emergency but is simply too accessible to be used for 9-1-1 calls as it would certainly result in accidental emergency calls frequently.

A sequence of actions may be utilized in order to initiate an emergency call. Several sequences may be possible. Initially, a simultaneous push/pull sequence may be utilized. For instance, a user may push the selection key 206 while simultaneously pulling the pull cord 208 to result in automatically entering an emergency mode. Alternatively, a user may push the selection key 206 while simultaneously pulling the pull cord 208 in order to prompt a confirmation to enter emergency mode. Furthermore, a user may pull the pull cord 208 and then confirm to initiate an emergency mode (i.e., place an emergency call to, for example, 9-1-1). Upon completion of the call, or cancellation (should the user desire), the pull cord 208 may be replaced into the user device by simply pushing the cord into the device until the pull cord 208 is no longer in an extended position.

Figure 3:
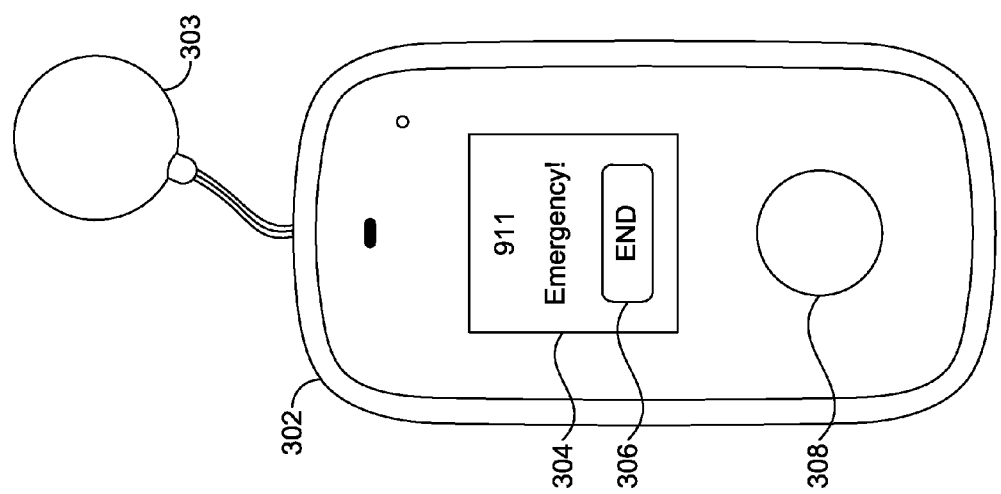
FIG. 3 depicts an illustrative interface of a user device, in accordance with an embodiment of the present invention.

FIG. 3 provides an exemplary user interface 304 for initiating an emergency mode. In the embodiment illustrated in FIG. 3, a sequence of actions has been performed on the user device 302. Assume that a user has simultaneously pushed the selection key 308 while pulling out the pull cord 303. In the illustration, the user interface 304 displays automatic entry into an emergency mode. In other words, an emergency call to 9-1-1 has been automatically initiated upon the simultaneous push/pull sequence. A termination key 306 may be displayed so that a user can quickly cancel the call in case the sequence of actions was performed by mistake.

Figure 4:
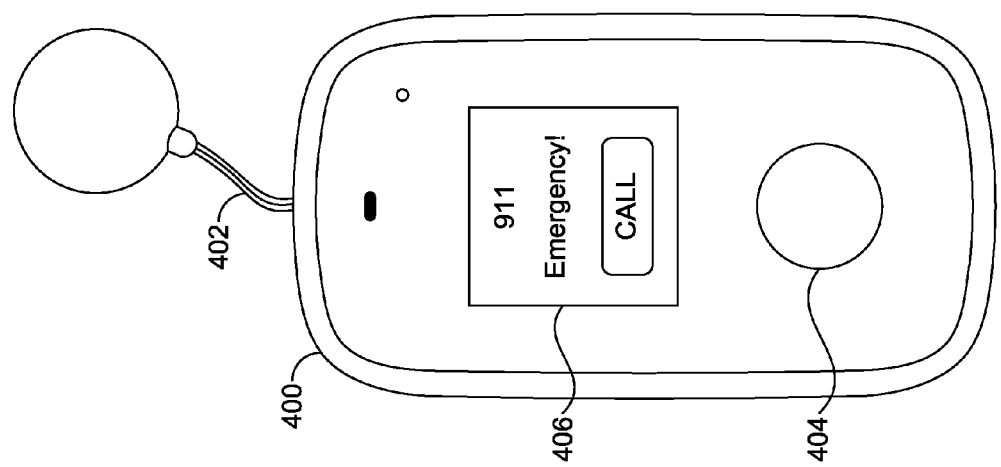
FIG. 4 depicts an illustrative interface of a user device, in accordance with an embodiment of the present invention.

Turning now to FIG. 4, an exemplary user interface 406 for initiating an emergency mode is provided. In the embodiment illustrated in FIG. 4, a confirmation interface 406 is displayed to a user on the user device 400 upon identifying a sequence of actions. The confirmation interface 406 may be displayed when the selection key 404 and the pull cord 402 are simultaneously activated (i.e., the selection key 404 is pushed and the pull cord 402 is pulled at the same time). Alternatively, simply pulling the pull cord 402 may initiate display of the confirmation interface 406 such that a user can confirm the emergency mode initiated by selecting the 'call' button. The call button may be selected directly on the confirmation interface 406 or may be selected by depressing the selection key 404.

Cancel options may be presented at any time such that a user can cancel any emergency mode that may be initiated. For instance, should a user accidentally pull a pull cord while selecting the selection key, the user device may display a user interface with a 'cancel' option such that the user may select 'cancel' and abort the emergency mode.

Figure 5:
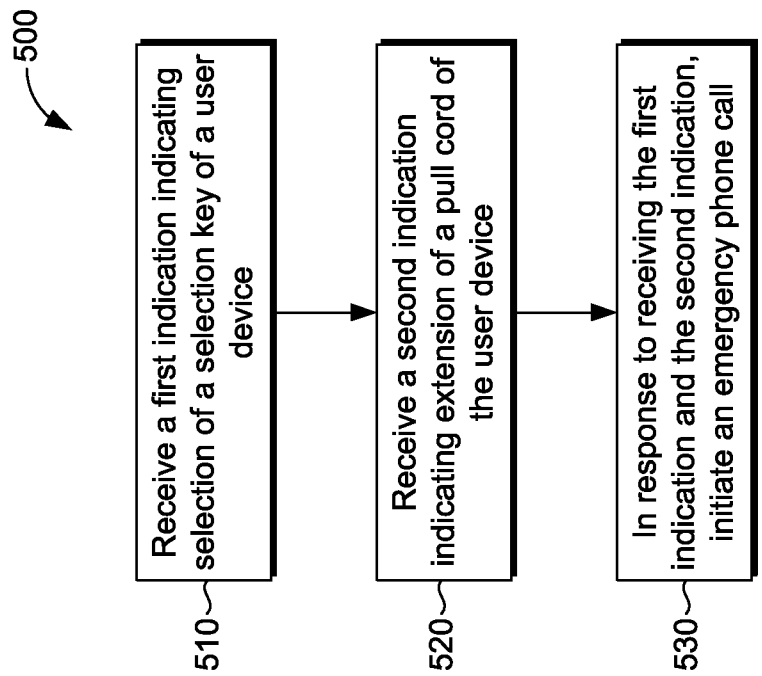
FIG. 5 provides a first exemplary method for initiating an emergency mode, in accordance with an embodiment of the present invention.

Turning now to FIG. 5, a flow diagram is shown illustrating a first exemplary method 500 for initiating an emergency mode, in accordance with an embodiment of the present invention. At block 510 a first indication indicating selection of a selection key of a user device is received. A second indication indicating extension of a pull cord of the user device is received at block 520. The first and second indications may be simultaneously performed. At block 530 an emergency phone call is initiating upon response to receiving the first indication and the second indication.

Figure 6:
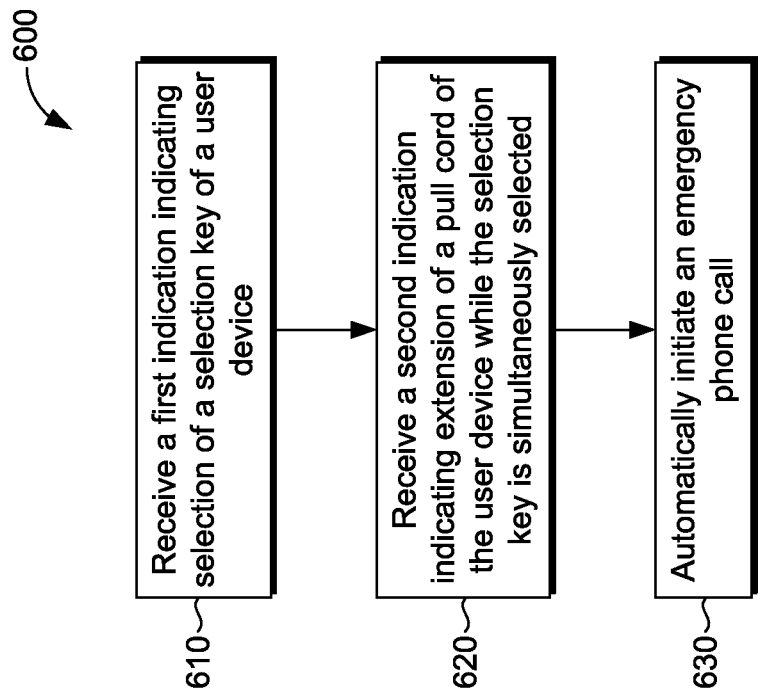
FIG. 6 provides a second exemplary method for initiating an emergency mode, in accordance with an embodiment of the present invention.

Turning now to FIG. 6, a flow diagram is shown illustrating a first exemplary method 600 for initiating an emergency mode, in accordance with an embodiment of the present invention. At block 610 a first indication indicating selection of a selection key of a user device is received. At block 620 a second indication indicating extension of a pull cord of the user device while the selection key is simultaneously selected is received. At block 630 an emergency phone call is automatically initiated.

It will be understood by those of ordinary skill in the art that the order of steps shown in the methods 500 of FIG. 5 and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method, the method comprising:

receiving a first indication indicating selection of a selection key of a user device;

while the selection key is selected, simultaneously receiving a second indication indicating extension of a pull cord of the user device; and in response to receiving the first indication and the second indication, initiating an emergency phone call.

2. The media of claim 1, wherein the emergency phone call is a phone call to 9-1-1.

3. The media of claim 1, wherein the first indication and the second indication are received simultaneously.

4. The media of claim 3, further comprising displaying a cancel option such that selection thereof results in cancellation of the emergency phone call.

5. The media of claim 1, further comprising receiving an indication that the pull cord has been replaced into the user device such that it is no longer in an extended position.

6. The media of claim 1, further comprising displaying a confirmation option.

7. The media of claim 6, further comprising receiving a selection of the confirmation option such that the emergency phone call is communicated.

8. The media of claim 1, wherein extension of the pull cord results in an audible sound being emitted from the user device.

9. The media of claim 8, wherein the audible sound alerts a user that the user device is in an emergency mode.

10. A method for initiating an emergency phone call, the method comprising:

receiving a first indication indicating selection of a selection key of a user device;

receiving a second indication indicating extension of a pull cord of the user device while the selection key is simultaneously selected; and automatically initiating the emergency phone call in response to receiving the first indication and receiving the second indication while the selection key was simultaneously selected.

11. The method of claim 10, wherein the emergency phone call is a phone call to 9-1-1.

12. The method of claim 10, further comprising displaying a cancel option such that selection thereof results in cancellation of the emergency phone call.

13. The method of claim 10, further comprising receiving an indication that the pull cord has been replaced into the user device such that it is no longer in an extended position.

14. A user device associated with one or more processors and one or more non-transitory computer storage media, the user device comprising:

a pull cord configured to extend outward from the user device, wherein extension of the pull cord results in a first indication;

a selection key configured for selection, wherein selection thereof in combination with concurrent extension of the pull cord, results in a second indication; and one or more processors configured to automatically initiate an emergency phone call in response to receiving the first indication and receiving the second indication.

15. The user device of claim 14, wherein the emergency phone call is a phone call to 9-1-1.

16. The user device of claim 14, wherein the user device further comprises an illustrative display configured to display a call message when the emergency phone call is initiated.

17. The user device of claim 16, wherein the illustrative display is further configured to display a cancel option.

18. The user device of claim 17, wherein selection of the cancel option results in cancellation of the emergency phone call.

19. The user device of claim 14, wherein the user device is further configured to display a confirmation message to confirm the emergency phone call.

20. The user device of claim 19, wherein the confirmation message is displayed when the pull cord is extended at a different time than selection of the selection key.

* * * * *